(12) United States Patent
Haslett et al.

(10) Patent No.: US 11,880,030 B2
(45) Date of Patent: Jan. 23, 2024

(54) PROGRAMMABLE INJECTOR GRID PLATE

(71) Applicant: Google LLC, Mountain View, CA (US)

(72) Inventors: Thomas L. Haslett, Toronto (CA);
Robert M. Krause, Newark, DE (US);
Jill Berger, Saratoga, CA (US); Kevin Yasumura, Lafayette, CA (US)

(73) Assignee: Google LLC, Mountain View, CA (US)

( * ) Notice: Subject to any disclaimer, the term of this patent is extended or adjusted under 35 U.S.C. 154(b) by 322 days.

(21) Appl. No.: 17/101,302

(22) Filed: Nov. 23, 2020

(65) Prior Publication Data

US 2021/0263300 A1    Aug. 26, 2021

Related U.S. Application Data

(60) Provisional application No. 62/980,605, filed on Feb. 24, 2020.

(51) Int. Cl.
*G02B 26/08* (2006.01)
*G02B 27/10* (2006.01)
*G02B 6/35* (2006.01)

(52) U.S. Cl.
CPC ..... *G02B 26/0833* (2013.01); *G02B 27/1006* (2013.01); *G02B 6/3518* (2013.01)

(58) Field of Classification Search
CPC ............ G02B 26/0833; G02B 27/1006; G02B 6/3518; G02B 6/3556; G02B 6/359; G02B 26/0816; G02B 27/283; G02B 1/0121
See application file for complete search history.

(56) References Cited

U.S. PATENT DOCUMENTS

| | | | |
|---|---|---|---|
| 5,596,451 A | 1/1997 | Handschy et al. | |
| 6,025,890 A | 2/2000 | Chase | |
| 6,331,916 B1 | 12/2001 | Mukawa | |
| 6,525,863 B1 | 2/2003 | Riza | |
| 6,944,437 B2 | 9/2005 | Yang et al. | |
| 8,854,597 B2 | 10/2014 | Sharma et al. | |
| 2001/0050787 A1* | 12/2001 | Crossland | G02F 1/292 359/9 |
| 2002/0176151 A1 | 11/2002 | Moon et al. | |
| 2003/0086147 A1 | 5/2003 | Bruns | |
| 2004/0129871 A1 | 7/2004 | Laberge et al. | |
| 2006/0072872 A1* | 4/2006 | Mitamura | G02B 6/2931 385/24 |

(Continued)

FOREIGN PATENT DOCUMENTS

| | | |
|---|---|---|
| CN | 102150069 B | 3/2014 |
| CN | 109143605 A | 1/2019 |

(Continued)

OTHER PUBLICATIONS

Notification of First Office Action for Chinese Patent Application No. 202011434526 2 dated Feb. 17, 2022. 17 pages.

(Continued)

*Primary Examiner* — Elmito Breval
(74) *Attorney, Agent, or Firm* — Lerner David LLP

(57) ABSTRACT

A programmable beam blocker includes a liquid crystal based grid of pixels, one or more groups of pixels, or plurality of pixels, corresponding to individual beams of light. The application of a voltage through one pixel can change the phase of the liquid crystal material to prevent the transmission of light through it.

23 Claims, 13 Drawing Sheets

(56) References Cited

U.S. PATENT DOCUMENTS

| | | |
|---|---|---|
| 2012/0236216 A1 | 9/2012 | Sharma et al. |
| 2014/0085426 A1 | 3/2014 | Leone et al. |
| 2018/0143508 A1 | 5/2018 | Uetsuka et al. |
| 2018/0364419 A1 | 12/2018 | Yasumura et al. |

FOREIGN PATENT DOCUMENTS

| | | |
|---|---|---|
| EP | 2372471 A1 | 10/2011 |
| EP | 3208531 A2 | 8/2017 |
| TW | 201905542 A | 2/2019 |
| WO | 2018231308 A1 | 12/2018 |

OTHER PUBLICATIONS

Extended European Search Report for European Patent Application No. 20212497.0 dated Jun. 1, 2021. 5 pages.

Qixiang Cheng et al., Photonic switching in high performance datacenters, Optics Express 16022, vol. 26, No. 12, Jun. 11, 2018, 22 pages.

Lawrence H. Domash et al., Programmable beamlet generator, dynamic lens, and optical memory using electrically switched holographic devices, SPIE's 1993 International Symposium on Optics, Imaging, and Instrumentation, 1993, downloaded from spiedigitallibrary.org, 12 pages.

John Heebner et al., A programmable beam shaping system for tailoring the profile of high fluence laser beams, Laser Damage Symposium XLII: Annual Symposium on Optical Materials for High Power Lasers, 2010, downloaded from spiedigitallibrary.org, 7 pages.

Abdul A. S. Awwal et al., Image processing and control of a programmable spatial light modulator for spatial beam shaping, SPIE LASE, 2013, downloaded from spiedigitallibrary.org, 13 pages.

Roland F. Koontz et al., Multiple Beam Pulse Capability of the Slac Injector, IEEE Transactions on Nuclear Science, Jun. 1967, 6 pages.

Notification of the Second Office Action for Chinese Patent Application No. 202011434526.2 dated Sep. 5, 2022. 11 pages.

Office Action for Chinese Patent Application No. 202011434526.2 dated Jan. 20, 2023. 13 pages.

Office Action for Taiwanese Patent Application No. 109144281 dated Jun. 1, 2023. 8 pages.

\* cited by examiner

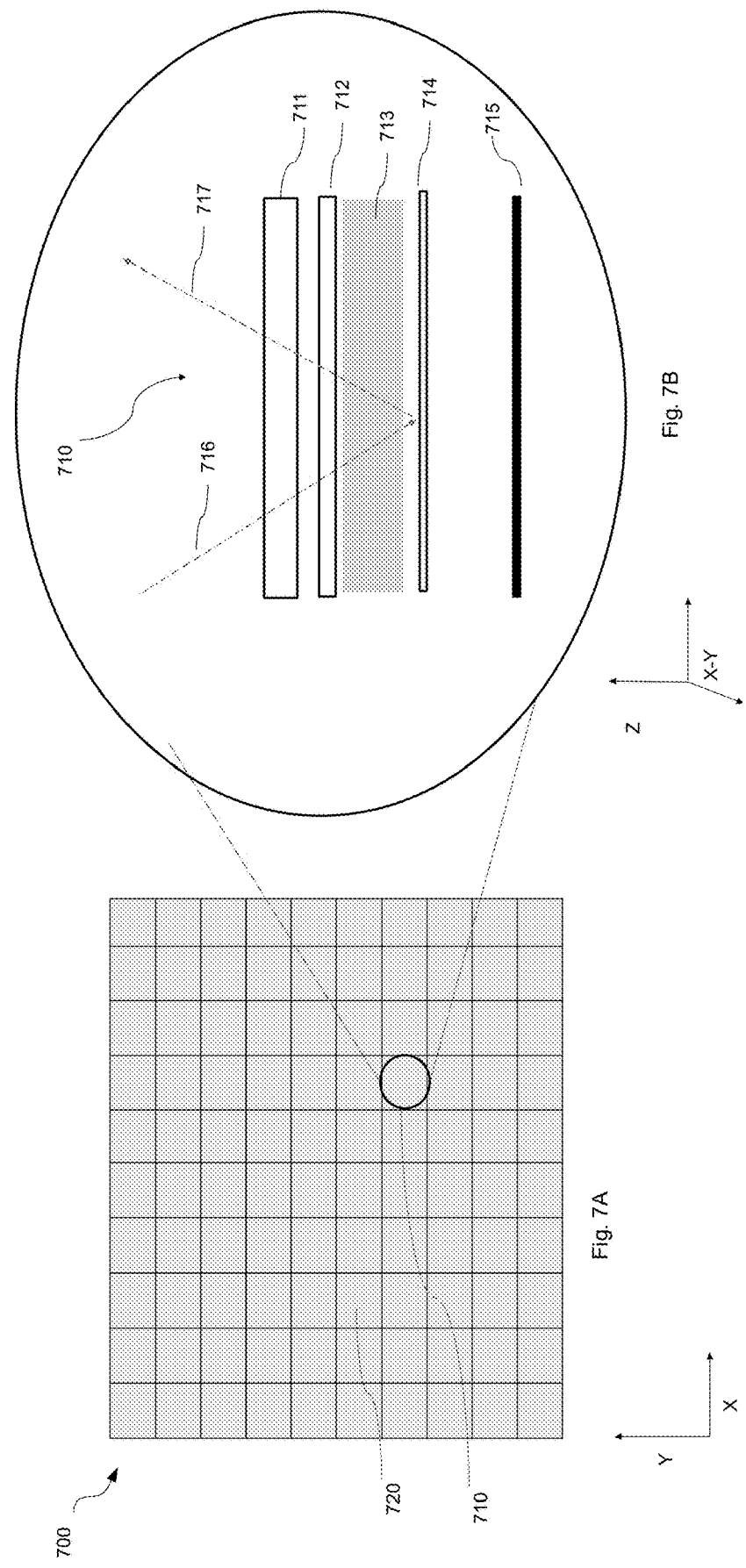

PROGRAMMABLE INJECTOR GRID PLATE

CROSS-REFERENCE TO RELATED APPLICATIONS

The present application claims the benefit of the filing date of U.S. Provisional Patent Application No. 62/980,605 filed Feb. 24, 2020, the disclosure of which is hereby incorporated herein by reference

BACKGROUND

Optical communications use modulated light beams to convey information through optical fibers, free space, or waveguides.

An optical circuit switch (OCS) is an all-optical, 3D switching matrix that can direct light from any input fiber N to any output fiber M by changing the angles of the mirrors in one or more micro-electromechanical system (MEMS) mirror arrays. The switch is designed for low insertion loss over a broad wavelength range, so each fiber can carry many wavelengths. The OCS is also designed for fast, reliable switching by the MEMS mirror arrays. Optical performance requirements include insertion loss, return loss, dynamic optical crosstalk, and static optical crosstalk.

SUMMARY

The present disclosure provides a programmable and dynamic blocking mechanism through the use of phase change materials, such as liquid crystal materials, to dynamically prevent the transmission of identified beams of light onto a MEMS mirror array. Although other methods exist to prevent the transmission of beams of light, such as parking or inking, these methods have their limitations. For example, although it is possible to "park" a mirror out of a camera sensor field of view in a servo system, the process requires high voltages, which can damage or prematurely age the instrumentation to later move the parked mirror. Further, inking or the use of epoxy on a plate to prevent a beam of light to be transmitted through the inked or epoxied portion is a static process which can be performed during the setup of the OCS, but cannot be performed to block other beams of light while the OCS is in use. A programmable beam blocker can consist of a grid of individual pixels, wherein each pixel is selectively activated or deactivated through a circuit. When a circuit is complete on an individual pixel, a voltage is applied to a liquid crystal material in the pixel. In response to the voltage, the liquid crystal material in the pixel changes phase state, and thus, shifts from a transmissive state, where photons can pass through the liquid crystal materials, to a non-transmissive state, wherein the beam of light hitting the pixel is blocked from transmission. In other examples, the programmable beam blocker can be configured to include additional "partial" states or "grey" states which are intermediate between transmissive and non-transmissive states. Unblocked beams can be gray scaled to shape a beam profile for a particular beam. In some examples, multiple liquid crystal pixels can be used to shape a beam of light. In other examples a Gaussian beam profile can be generated for the transmitted beams. The Gaussian or other beam profile can be an energy or intensity distribution in a two dimensional plane. In some examples, the beam profile can be any arbitrary two dimensional probability distribution or any arbitrary shape with varying levels of intensity or energy. Thus, individual beams of light can be selectively allowed to pass through or be blocked by the beam blocker while the OCS is active through appropriate circuitry.

One aspect of the disclosure provides a programmable beam injector including a light source, such as a laser, which is adapted to generate a beam of light, a polarizing beam splitter configured to receive the beam of light from the light source, and a beam blocker receiving the polarized beam of light. The beam blocker may include a plurality of pixel modulators, wherein each pixel modulator includes a plurality of liquid crystal cells, wherein each pixel modulator is independently operable between an off state in which the light passes through the polarizing beam splitter and an on state in which the light is blocked.

Additional aspects of this disclosure provide a programmable beam injector including a data connection configured to interface with an optical switching circuit control. The programmable beam injector can further be configured to receive information related to its operation from the optical switching circuit control. This information can be based on at least an image generated from a camera which received beams of light from the programmable beam injector. The programmable beam injector may include a beam blocker which contains a number of the pixel modulators that corresponds to a number of MEMS mirrors used in an optical switching circuit. In some examples, the number of pixel modulators or number of liquid crystal on silicon (LCOS) pixels may be larger than the number of MEMS mirrors. Each injector beam spot can cover a larger number of pixel modulators or LCOS pixels. LCOS pixels can be grouped into regions of interest (ROIs) and the grid of ROIs can correspond to the MEMS mirror grid and the number of MEMs mirrors. Each ROI will contain a number of pixels within the pixel modulator or LCOS pixel. The programmable beam injector may include a light source which is a diode laser. The programmable beam injector can block the light beams through phase modulation or through amplitude modulation, or a combination of phase modulation and amplitude modulation.

Additional aspects of this disclosure provide an optical switching circuit including a microelectromechanical systems (MEMS) mirror configured to receive a beam of light, a camera configured to capture the beam of light, a fiber collimator; and a programmable beam injector which can further include a light source, such as a laser, which is adapted to generate a beam of light, a polarizing beam splitter configured to receive the beam of light from the light source, and a beam blocker receiving the polarized beam of light. The programmable beam injector of the optical switching circuit may further include a data connection and be in data communication with an optical switching circuit controller. Instructions can be sent to the programmable beam injector based on algorithms which utilize as input information from at least the camera and MEMS mirror controller.

An additional aspect of this disclosure provides a method of selectively blocking, in an optical switching circuit, a beam of light generated by a light source. The method may include configuring a first pixel modulator of a plurality of pixel modulators in an off state, wherein voltage is not applied to the first pixel modulator; configuring a second pixel modulator of the plurality of pixel modulators in an on state, wherein a voltage is applied to the second pixel modulator; receiving, at the first pixel modulator, a first beam of light; transmitting the received beam of light through the first pixel modulator; receiving, at the second pixel modulator, a second beam of light; and blocking, by the second pixel modulator, the second beam of light.

Additional aspects of this disclosure provide a method any combination of: configuring a first pixel modulator of a plurality of pixel modulators in an off state, wherein voltage is not applied to the first pixel modulator; configuring a second pixel modulator of the plurality of pixel modulators in an on state, wherein a voltage is applied to the second pixel modulator; receiving, at the first pixel modulator, a first beam of light; transmitting the received beam of light through the first pixel modulator; receiving, at the second pixel modulator, a second beam of light; and blocking, by the second pixel modulator, the second beam of light; capturing, by a camera, an image wherein the image represents blocked beams with dark spots and unblocked beams with light spots; capturing, by a camera, an image wherein the image represents blocked beams with dark spots, unblocked beams with light spots, and gray scale spots representing beams with varying amounts of energy, the image representing regions of interest and reflecting the beam shaping aspect of unblocked beams; beam shaping the unblocked beams using grey scaling; reprogramming at least one of the first pixel modulator or the second pixel modulator; reprogramming the at least one of the first pixel modulator or the second pixel modulator may include changing a voltage applied to the pixel modulator, such that the pixel modulator transitions to a different state as a result of the change in applied voltage; comparing at an OCS controller, information generated from the captured image with information related to the plurality of pixel modulators; automatically reprogramming a pixel modulator corresponding to a beam of light when information generated from the captured image indicates that a parameter of the beam of light is below a certain threshold; a parameter measured being the intensity of the beam of light; automatically reprogramming a second pixel modulator to transmit a previously blocked beam of light based on information from an optical control switch controller; evaluating, at an OCS controller, a malfunction in the MEMS mirror array or MEMS controller based upon information generated from the captured image, information related to the plurality of pixel modulators, and information received from the MEMS controller.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 7A is a diagram of a programmable beam blocker for use in an integrated optical assembly according to aspects of the disclosure;

FIG. 7B is a diagram of a cross-sectional view of a pixel array of a programmable beam blocker for use in an integrated optical assembly according to aspects of the disclosure;

DETAILED DESCRIPTION

This disclosure generally relates to methods, systems, and apparatuses to control the transmission of beams of light within an optical switch circuit (OCS). In particular, the beam injector is programmable to selectively illuminate individual beams while blocking other individual beams. The individual beams may be blocked by, for example, applying a voltage to a pixel modulator, such as a liquid crystal on silicon spatial light modulator (LCOS-SLM). The voltage may cause the pixel modulator to transition to a state where light beams are blocked, such as by a rotation of liquid crystal elements in the LCOS-SLM. In this regard, the programmable injector can electronically block beams as it would if a physical grid plate were present. However, the injector can be reprogrammed to block different beams without changing hardware of other physical components in the injector.

Figure 1:
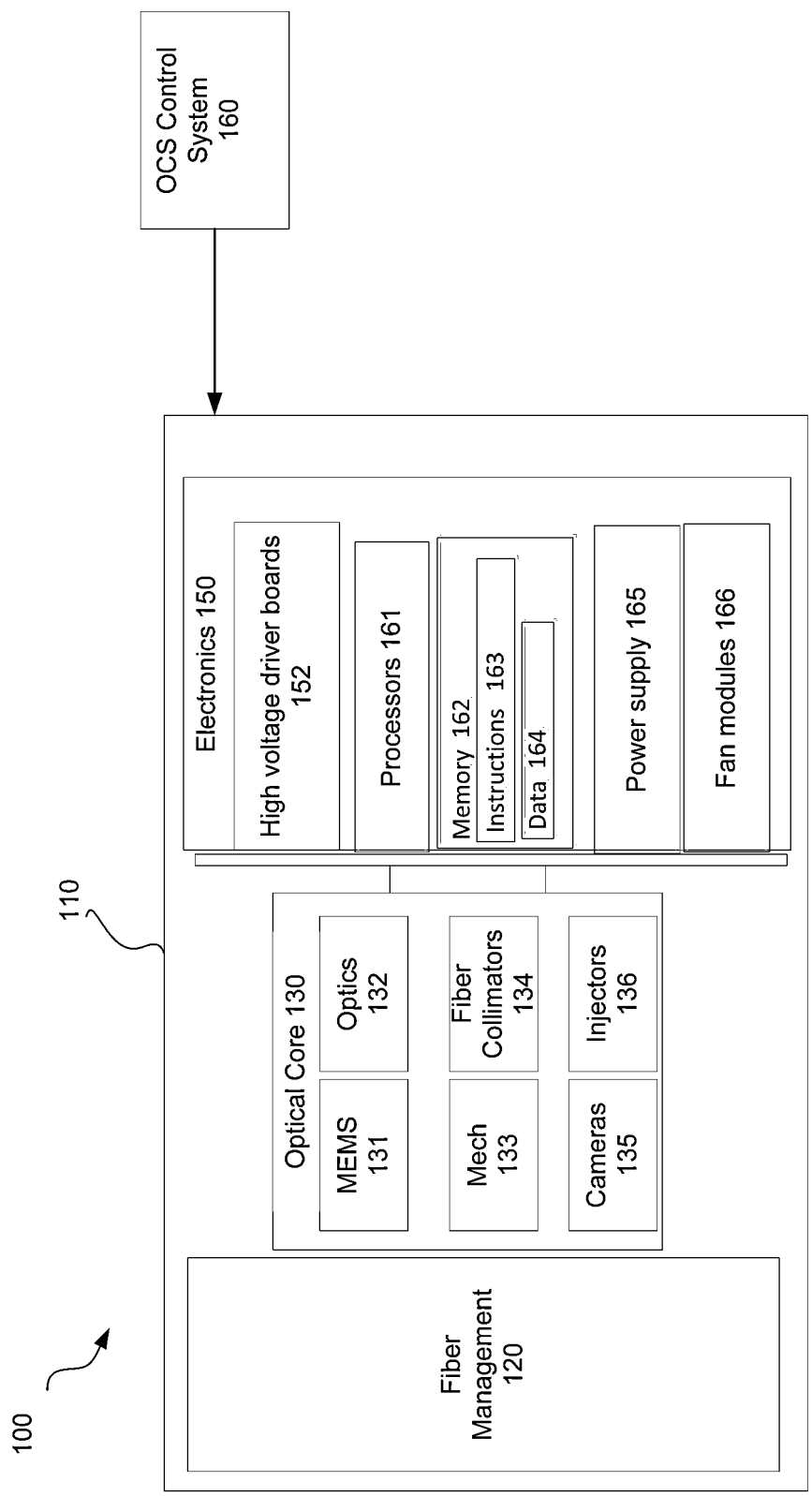
FIG. 1 is a block diagram of an example optical circuit switch according to aspects of the disclosure.

FIG. 1 illustrates an example OCS 100. The OCS 100 includes a structure such as chassis 110 supporting a number of components. In a front of the OCS chassis 110 are optical fiber connections, such as fiber management block 120. The OCS 100 may further include, such as in a middle, an optical core 130. The optical core houses MEMS 131, fiber collimators 134, optics 132, cameras 135, and injectors 136 and other mechanisms 133. A rear of the OCS 100 includes electronics 150, such as high voltage driver boards 152 for the MEMS, one or more processors 161, such as a CPU board, one or more memories 162 storing executable software, and power supplies 165 and fan modules 166. The chassis 110 interfaces with OCS control system 160. While a number of components are shown, it should be understood that such components are merely non-limiting examples, and that other components may additionally or alternatively be included.

There may be any number of input fibers and output fibers connected to the front of the OCS chassis 110. Inside the chassis 110, these fiber fanouts are spliced to the fiber collimators 134.

The fiber collimators 134 are lensed fiber arrays. Just as one example, the fiber collimators 134 may include tens or hundreds or more fibers. The fibers are assembled in a hole array that matches a MEMS array grid pattern, thereby forming a fiber array. The hole array may be made of silicon or other materials. The fiber array is attached to a mounting flange. A lens array is aligned and attached to the fiber array. Fiber and lens position errors are very tightly controlled.

The one or more processors 161 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of the OCS control system 160 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the OCS control system 160. Accordingly, references to a processor or computing device will be understood to include references to a collection of processors or computing devices or memories that may or may not operate in parallel.

Memory 162 may store information that is accessible by the processors 161, including instructions 163 that may be executed by the processors 161, and data 164. The memory 162 may be of a type of memory operative to store information accessible by the processors 161, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 163 and data 164 are stored on different types of media.

Data 164 may be retrieved, stored or modified by processors 161 in accordance with the instructions 163. For instance, although the present disclosure is not limited by a particular data structure, the data 164 may be stored in computer registers, in a relational database as a table having a plurality of different fields and records, XML documents, or flat files. The data 164 may also be formatted in a computer-readable format such as, but not limited to, binary values, ASCII or Unicode. By further way of example only, the data 164 may be stored as bitmaps comprised of pixels that are stored in compressed or uncompressed, or various image formats (e.g., JPEG), vector-based formats (e.g., SVG) or computer instructions for drawing graphics. Moreover, the data 164 may comprise information sufficient to identify the relevant information, such as numbers, descriptive text, proprietary codes, pointers, references to data stored in other memories (including other network locations) or information that is used by a function to calculate the relevant data.

The instructions 163 may be executed to selectively activate or deactivate particular pixel modulators within an injector of the optical circuit switch. Such activation or deactivation may affect the blocking or transmission of individual beams of light through the injector. It should be understood that the optical circuit switch 900 may include other components which are not shown but may be utilized in execution of the instructions 163.

Figure 2A:
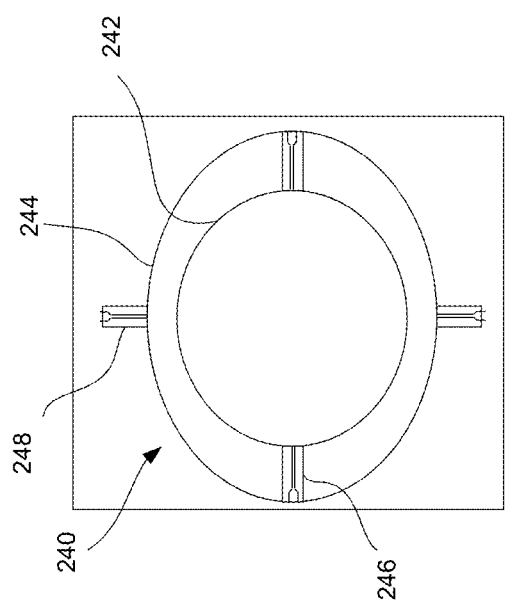
FIG. 2A is a diagram of a two-axis microelectromechanical system (MEMS) mirror assembly for use in an integrated optical assembly, according to aspects of the disclosure.

FIG. 2A illustrates an example MEMS mirror 240. The MEMS mirror 240 may be approximately 1 mm in size and highly reflective. For example, the MEMS mirror 240 may be coated with a highly reflective material, such as gold. The mirror 240 includes an inner portion 242 and an outer portion 244, wherein the inner portion is rotatable about a first axis and the outer portion is rotatable about a second axis. For example, the inner portion may rotate about inner torsion beams 246 actuated by a comb drive actuator. The outer portion may rotate about outer torsion beams 248 actuated by a comb drive actuator. The comb drive actuators may be high voltage, electro-static vertical comb drives which rotate the mirrors about the torsion beams. For example, the rotation may be approximately +/-1-10 degrees when a voltage ranging between 10 s of volts to hundreds of volts is applied across the electrodes.

Figure 2B:
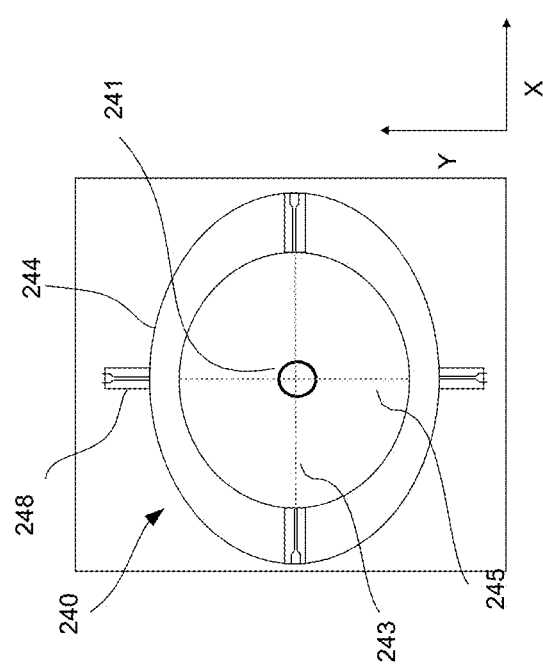
FIG. 2B is a diagram of a two-axis microelectromechanical system (MEMS) mirror assembly for use in an integrated optical assembly, according to aspects of the disclosure.

FIG. 2B illustrates additional aspects of MEMS mirror 240. FIG. 2B illustrates the centroid of MEMS mirror 240, centroid 241. Centroid 241 can correspond with the center of mass of MEMS mirror 240. For example, when the density of the MEMS mirror is uniform, the center of mass and the centroid 241 would be at the same location. FIG. 2B also illustrates a first axis 243 of rotation, such as an x-axis. Similarly, FIG. 2B illustrates a second axis 245 of rotation, such as a y-axis. Rotation of the MEMS mirror about either axis 243 or axis 245 can be achieved through rotating torsion beam 246 or torsion beam 248 respectively. By actuation of all torsion beams attached to MEMS mirror 240, it is possible to move MEMS mirror 240 in a direction perpendicular to the plane formed by the two axes of rotation, axis 243 and axis 245, such as a z-axis. Thus, the MEMS mirror can be moved in at least three independent directions. The movement of the MEMS mirror in these three independent directions can also be referred to as tip, tilt, and piston actuation of the MEMS mirror. The amount of movement of the MEMS mirror can be tracked by the movement of centroid 241 with respect to three independent axes, such as an x-axis, y-axis, and z-axis.

In some examples, it may be necessary to adjust the positioning of one or more MEMS mirrors, such as MEMS mirror 240. As an example, a MEMS mirror may be rotated in place. This affects the reflection of injector beams incident on the rotated MEMS mirror. This in turn affects the view of injector beams, which are reflected from the MEMS mirror, as it causes those injector beams to move across the field of view of a camera.

In other examples, a MEMS mirror can be "parked" to remove it from the path of light of a particular beam. Parking can be achieved by applying voltages to the driver elements capable of moving a MEMS mirror. However, the high voltage required to park a MEMS mirror can damage the driver elements associated with the MEMS mirror through more stress on electronic components and aging, increasing the likelihood of failure in the future. Additional methods and apparatuses to prevent the interference caused by an unwanted light beam are discussed below.

Figure 3:
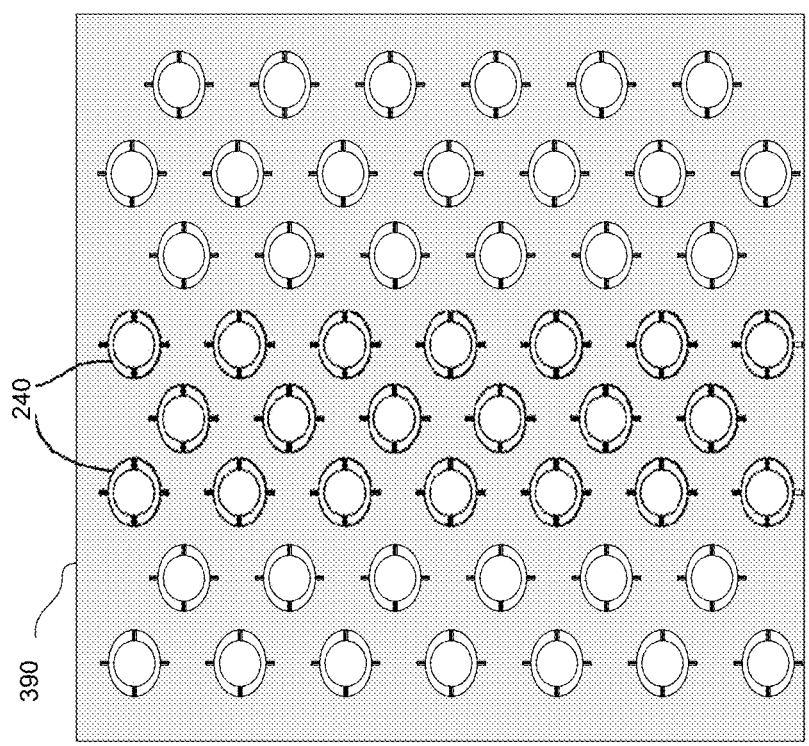
FIG. 3 is a diagram of a two-axis microelectromechanical system (MEMS) mirror assembly for use in an integrated optical assembly, according to aspects of the disclosure.

FIG. 3 illustrates an example die including an array of MEMS mirrors 240. According to some examples, the MEMS die packages include MEMS mirror arrays, but in other examples any number of MEMS mirrors may be included. The MEMS die may be hermetically sealed inside a package with a window in its lid. Not all of the mirrors may be needed or used at a same time. For example, only the best mirrors in a MEMS mirror array and corresponding fibers in a fiber array may be selected to make an optical switch, which may be divided as a number of ports+several spares.

Figure 4:
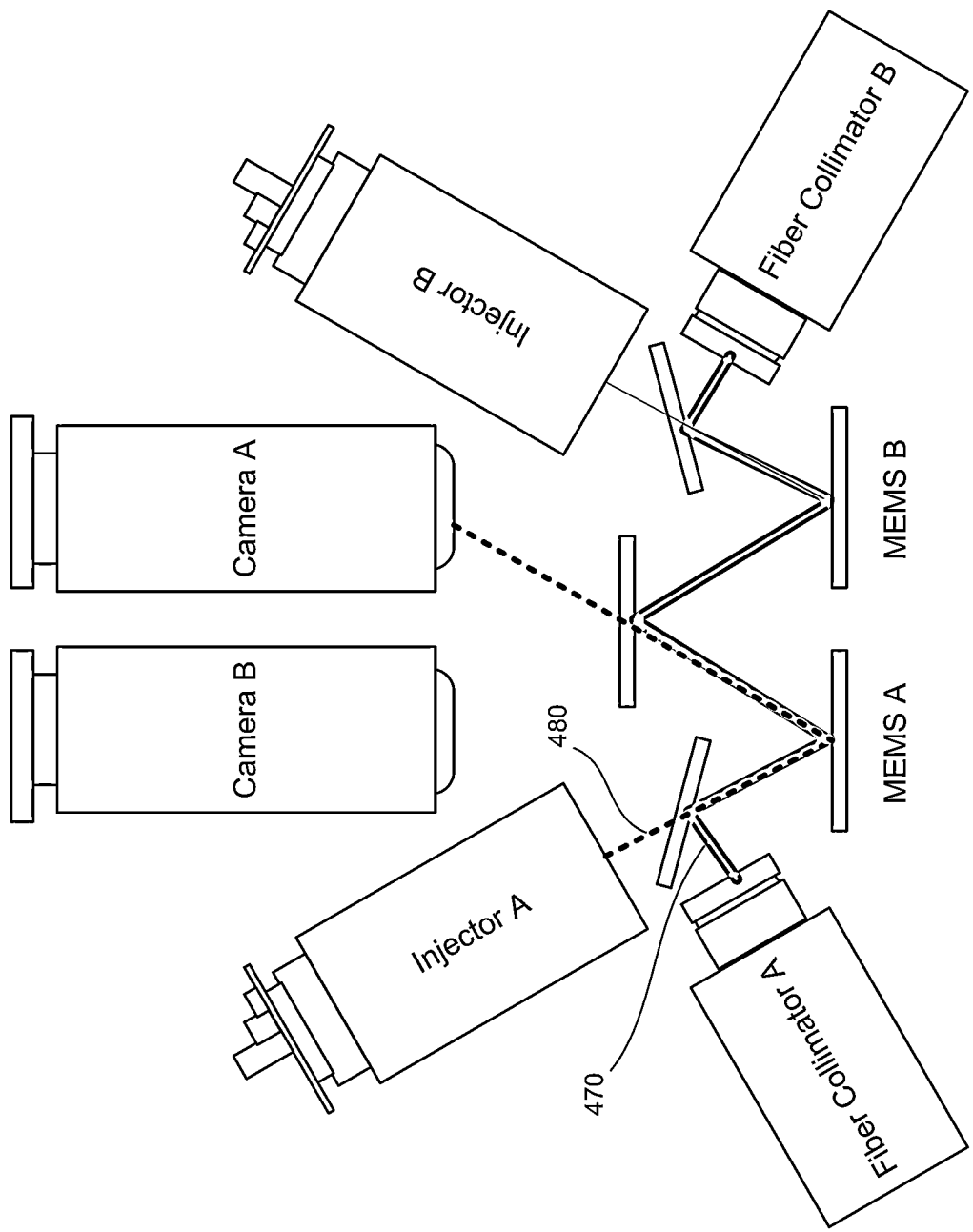
FIG. 4 is a diagram of an optical circuit switch, according to aspects of the disclosure.

FIG. 4 provides an example of a data optical path and a monitor optical path included in the optical core. On data path 470, traffic comes in as light input to fiber collimator A. All of the optics in the data path 470 may be designed for very low loss over a variety of wavelengths. The light travels along this path 470, and is reflected from MEMSA, then from MEMSB, then is coupled to output fiber collimator B. MEMS A and MEMS B may be just two MEMS mirrors of a larger array, such as illustrated in FIG. 3 and explained above. By rotating the mirrors in the array, light from any input fiber can be coupled to any output fiber. The injectors shine small laser beams on the MEMS. The cameras image the beams reflected from the MEMS to measure the mirror positions.

Monitor path 480 does not carry data, but provides information to a mirror control system about the positions of the mirrors. This may be done using, for example, an injector to shine small beams on each of the MEMS mirrors, and a camera to view the positions of the beams reflected from the MEMS. There may be a camera/injector pair for each MEMS array.

Figure 5:
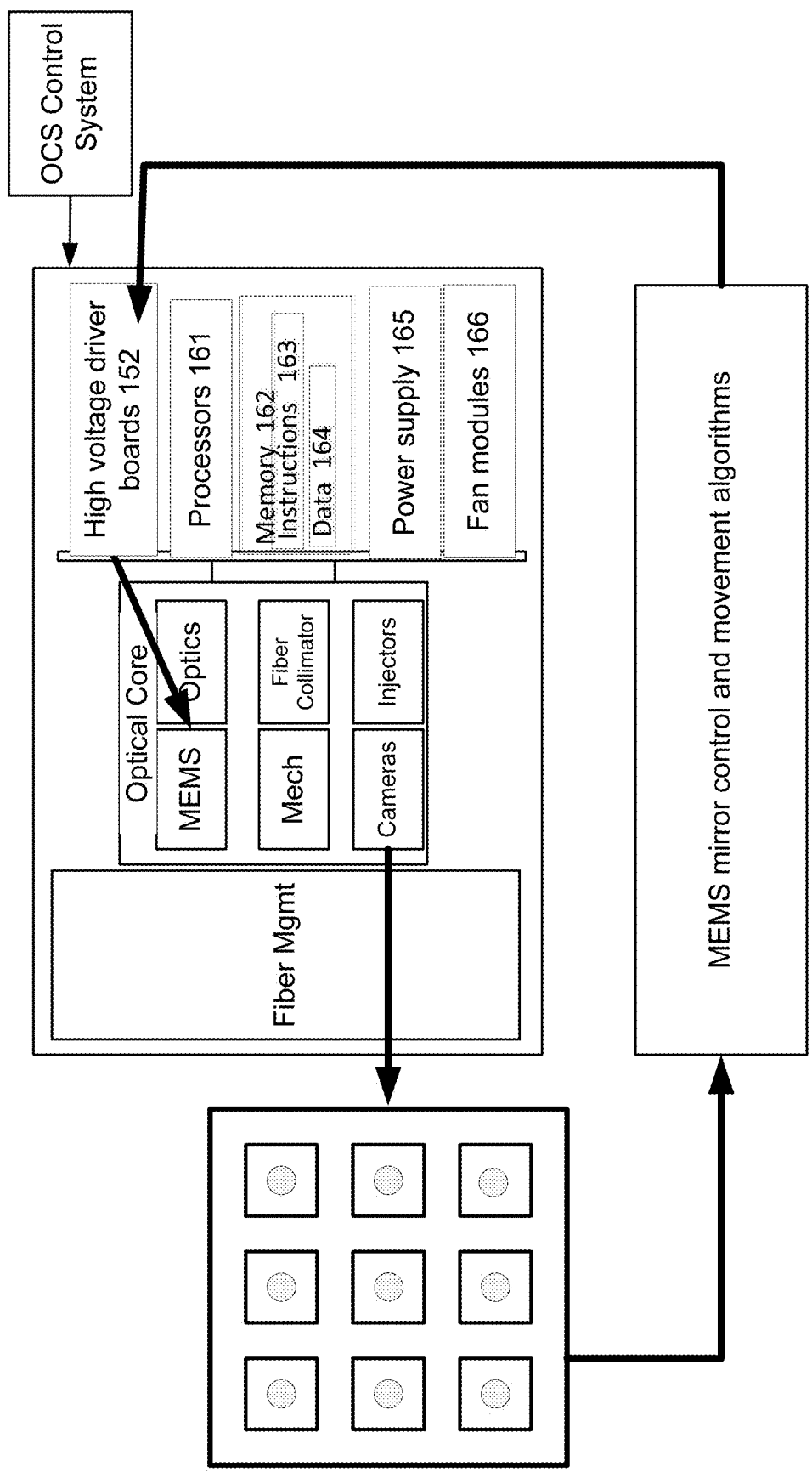
FIG. 5 is a diagram of a feedback in a mirror control loop according to aspects of the disclosure.

FIG. 5 illustrates an example mirror control loop. The OCS control system 160 tells the OCS what configuration it should be in. The mirror control loop handles the MEMS mirror control and movement algorithms based on the monitor path data, and then tells the high voltage drivers to move the mirrors.

Figure 6A:
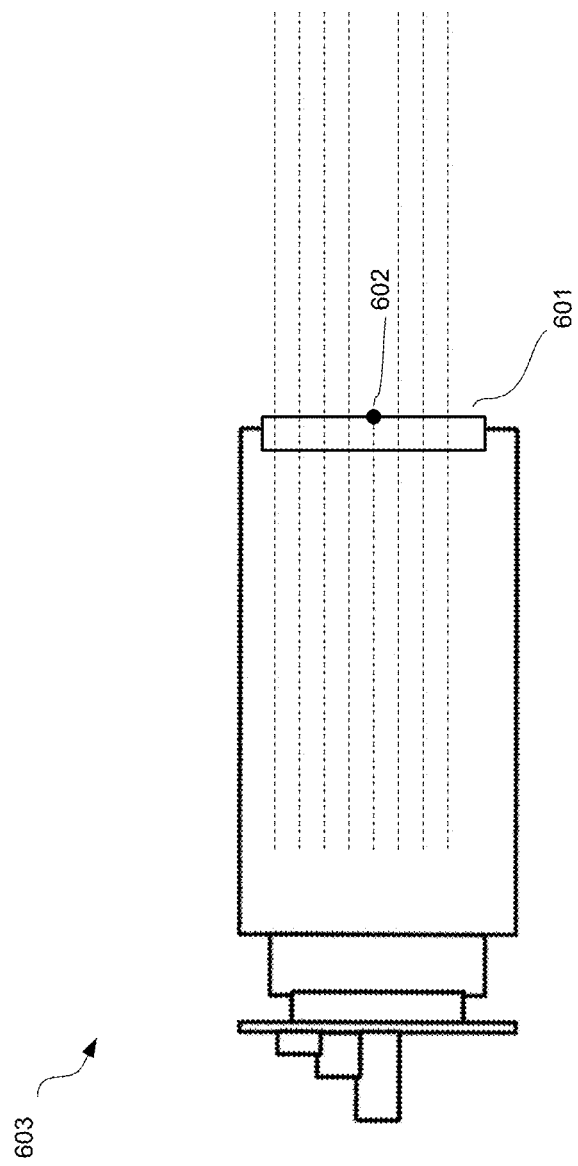
FIG. 6A is a diagram of an injector for use in an integrated optical assembly according to aspects of the disclosure.

FIG. 6A illustrates a simplified side view of an injector 603. Injector 603 can contain or be connected to a laser. The laser can be contained within a casing. Any suitable laser can be used as the light source of injector 603 to provide a source of photons. Injector 603 can also contain a reflective space light phase modulator to freely modulate light phases, such as a liquid crystal on silicon spatial light modulator (LCOS-SLM). Injector 603 can also operate transmissively rather than reflectively. By passing through a phase modulator the wavefront shape of the laser light can be controlled freely. Injector 603 can also contain a polarizing beam splitter. The polarizing beam splitter may split one source of light into multiple beams of light. For example, it may split the light from the laser. The splitter can be arranged such that the geometry of the beams of light or polarization of light can be configured as needed for a particular application. The beams can further be collimated by passing through the splitter and one or more lenses. These beams of light are illustrated in FIG. 6 as dashed parallel lines. The LCOS-SLM can be a matrix of active cells which through the control of voltage can differentially modulate the phase of light impinging upon the particular cell. The LCOS-SLM can change the wave front of an incident wavefront by modulating the phase of portions of the wavefront to cause a change in the phase of light.

FIG. 6A further illustrates a grid plate 601. The grid plate 601 can be attached on one end of injector 603 to modify or block the photons being emitted from injector 603. Just as one possible example, the grid plate can include 400 individual holes of a 0.5 mm outer diameter, which are etched in chromium deposited on a glass plate. In other examples, the grid plate can contain any integer number of individual holes, such as for example between 100 and 1000, with an outer diameter between 0.1 mm to 1 mm. A person of skill in the art will appreciate that the number of holes and dimension of the holes in the grid plate may vary. Other modifications to the grid plate 601 are possible. For example, certain holes can be blocked based on the fabrication of the MEMS mirror discussed above to prevent a beam from being transmitted through the grid plate and onto a specific MEMS mirror. This can be done through, for example, the use of epoxy on specific holes in the grid plate, such as illustrated by epoxy 602 in FIG. 6. However, physically modifying a grid plate, such as grid plate 601, has limited practicality within a larger optical system as the system would have to be shut down for the grid plate to be modified.

Figure 6B:
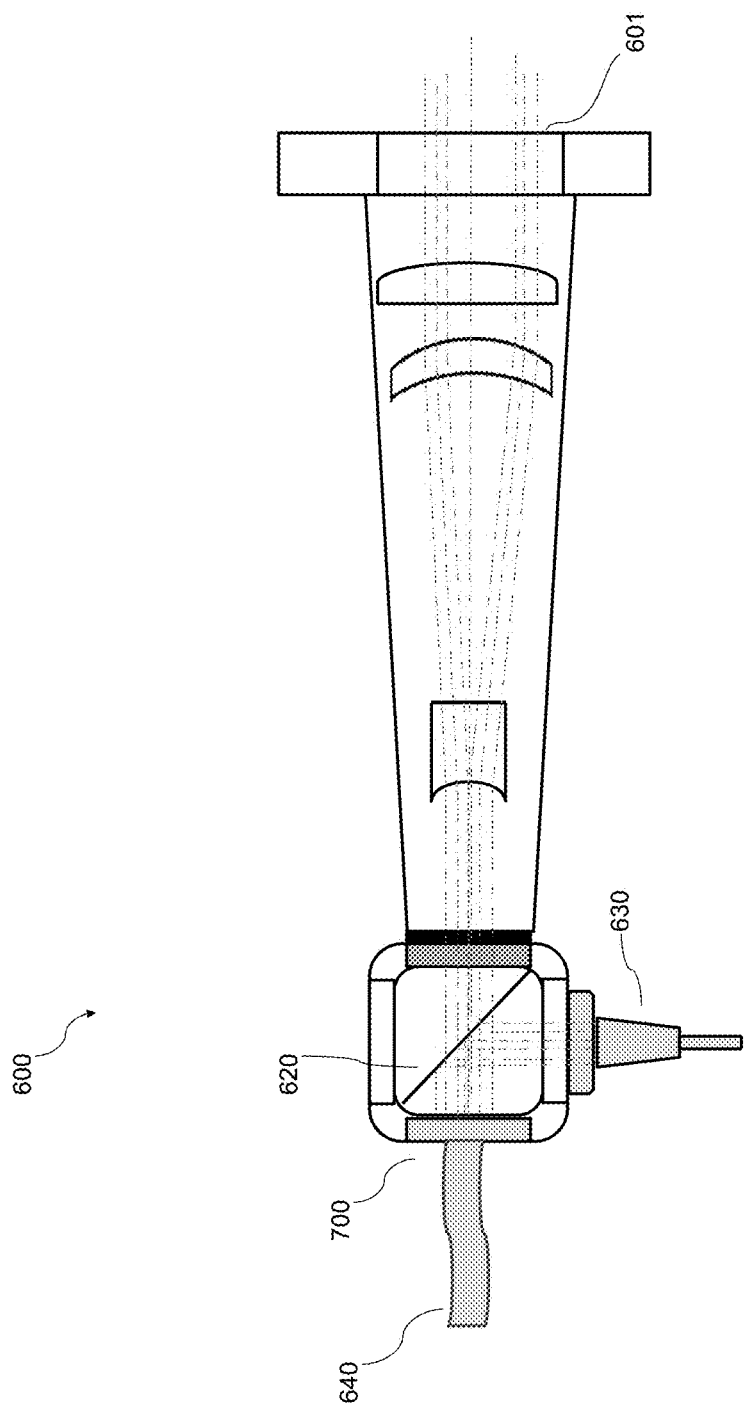
FIG. 6B is a diagram of an injector including a programmable beam blocker for use in an integrated optical assembly according to aspects of this disclosure.

FIG. 6B is a diagram of an injector 600. FIG. 6B illustrates the programmable beam blocker 700 at one end of the injector, a beam splitter 620, a laser 630, and a connector 640. Connector 640 can connect to other electronic and software controls, such as the OCS control system 160. Although illustrated in FIG. 6B on one end of the injector 600, programmable beam blocker 700 can be placed at or incorporated at other locations of injector 600. The programmable beam blocker can be integrated into an OCS and control the emission of specific beams of light from an injector. Other lenses, optical equipment, or a grid plate 601 may also be included in the injector 600. As such, the programmable beam blocker 700 may block particular beams of light, while others pass through the lenses and the grid plate 601.

As explained further below in reference to FIGS. 7A-7D, beam blocker 700 may include a glass portion, a liquid crystal portion, and a reflective or mirror portion. The beam blocker 700 may further include a plurality of pixel modulators, wherein each pixel modulator can be individually activated. For example, each beam of light may be input to a corresponding pixel modulator, wherein the pixel modulator determines whether the beam of light passes through to illuminate a pixel or whether the beam of light is blocked. When a beam of light arrives at a first pixel modulator of beam blocker 700 which is in an "off" state, the pixel modulator allows light to pass through it. For example, the light will pass through the pixel modulator and bounce from a mirror backing, back through beam splitter 620, and along the length of injector 600. When a beam of light arrives at a second pixel modulator of the beam blocker which is configured in the "on" state, the pixel modulator may prevent the light from passing through it.

In other examples, each beam of light may be an input to more than one pixel modulator. Stated alternatively, one beam of light may be wide enough to be an input to multiple pixel modulators. In this example, each pixel modulator illuminated by a beam of light may determine if the portion of the beam of light it receives passes through it or not. Thus, for example, similar to the description above, when a portion of a beam of light arrives at a pixel modulator of beam blocker which is in an "off" state, the pixel modulator allows light to pass through it.

Each pixel modulator may include, for example, a plurality of liquid crystal cells. Each pixel modulator may further include a switch that may be used to transition the pixel modulator between the "off" state, in which it transmits light, and the "on" state, in which it blocks light. Each pixel modulator may also have a "partial state" or "grey scale" state in which the pixels can vary the energy, phase, or amount of light, which is transmitted through the particular pixel. Partial states (also referred to as grey states, grey scale state, or grey blockers herein) of the LCOS pixels can have a specified non-zero transmission of the received light. A grey scale state or grey blocker can occur due to a change in the intensity of light due to a partial phase change of light passing through the grey blocker, which can correspond to a specific liquid crystal cell being between an "on" and an "off" state. In some examples, the grey states of the blocker can be nearly continuous while in others as a function of the applied voltage. The polarization rotation within a pixel can be used to convert phase modulation to intensity modulation, which controls the "on", "off" and "grey" states of the pixel.

The "on" and "off" state, or "partial" state, of an individual pixel can be controlled by sending instructions or electrical signals through connector 640, which is electrically coupled with beam blocker 700. When the pixel modulator transitions from the "off" state to the "on" state, for example, the plurality of liquid crystal cells in the pixel modulator may change phase to a phase state in which they block light. Similarly, when a pixel modulator transitions to a "grey" state, the amount of light being transmitted through that individual pixel can be controlled.

Collectively, pixel modulators may be used for beam shaping. Beam shaping can be used to provide a particular beam profile so that high fluence peaks are reduced. In some examples, beam shaping can take place through the use of electronics to create a transmission profile which can take on particular shapes. For example, a Gaussian beam profile can be generated for the transmitted beams. The Gaussian or other beam profile can be an energy or intensity distribution in a two dimensional plane. In some examples, the beam profile can be any arbitrary two dimensional probability distribution or any arbitrary shape with varying levels of intensity or energy. The overall beam spatial shape can be specified and implemented by the pixel modulators to ensure that the intensity (or grey) levels, location of blocking, and shape of light being transmitted conforms to a particular desired distribution. Through the use of partial states or grey blockers, certain advantages, such as those described with reference to FIG. 7F, can be achieved in regards to interference patterns formed by the waves of light.

Laser 630 can be any suitable laser of power and wavelength. FIG. 6B also illustrates an unlabeled line representing the path taken by a beam of light generated at laser 630. The beam of light can be polarized upon hitting the polarizing beam splitter. A portion of the beam of light, which is polarized will be transmitted to beam blocker 700.

Beam splitter 620 can be a polarizing beamsplitter, to split the light reflected from the beam blocker 700 into reflected S-polarized and transmitted P-polarized light Beam splitter 620 can be, for example, a plate beamsplitter, which consists of a thin flat glass plate that has been coated on one surface.

Beam blocker 700 can be used in a transmission or a reflection mode. Beam blocker 700 can be fully programmable as it can allow individual beamlets, or individual pixel cells which can be smaller than the size of the individual beamlet, to be turned on and off as needed. Beam blocker 700 can thus granularly control the shape and transmission of the beam of light. In addition, beam blocker 700 can be informationally connected with other parts of the OCS. For example, an OCS controller can compare information received from the beam blocker with information received from a camera or derived from an image captured by a camera. Thus, the OCS controller can check for the efficacy of the beam blocker 700 or any malfunction in its operation. Similarly, the OCS controller can compare the image captured by the camera and information from the beam blocker 700, described above, to determine which beams are to be blocked. When used within an injector, beam blocker 700 can control which beams are emitted from an injector to provide greater granularity and control of individual beams. Beam blocker 700 can thus be used in conjunction with the systems and apparatuses described above to prevent beams from reaching specified MEMS mirrors, and eliminating the need to park the specified mirrors. Additionally, as beam blocker 700 is fully programmable, and granular control of beams can be obtained, beam blocker 700 can enable for faster and better calibration of the OCS switch and individual MEMS mirrors. In addition, the blocking performed by beam blocker 700 is not permanent as the optical characteristics of the liquid crystal material can be modified by the addition or removal of a voltage to the material.

Injector 600, by being fully programmable, can facilitate additional information about the OCS being derived through algorithmic methods. The algorithms can use information generated from the path and characteristics of the beams of light emitted from injector 600. Injector 600 can further be in data communication with the optical communication system control through connector 640. The optical communication system control system can receive information from parts of the optical control system. An OCS transfers very large amounts of data in an efficient way through the use of mirrors and light beams. Thus, information related to the efficacy and configuration of the system, such as the MEMS mirror array, can operate the OCS effectively. Thus, information generated from the use of a programmable injector, as further explained below, can be used to derive more granular information about the OCS. As one example, injector 600 can shine a single beam of light by blocking other beams onto a single mirror in a MEMS array to capture or generate information related to that mirror by the OCS control system. This process can for example be repeated for every mirror. In other examples, light beams can be generated to more granularly test the efficacy of the MEMS mirror array. This information can be algorithmically used to automatically reroute information to mirrors which are more responsive or in better conditions.

FIGS. 7A-7F generally illustrate aspects of the beam blocker 700 in further detail. Also illustrated in FIGS. 7A-7D are Cartesian coordinates to illustrate the various aspects of the beam blocker 700, as more fully explained below. The Cartesian coordinates are used between the illustrative figures to represent various aspects of the beam blocker 700 from various views.

FIG. 7A illustrates a front view of the programmable beam blocker 700. Beam blocker 700 can be made of an array of cells, each cell including a spatial light modulator (SLM) based on reflective liquid crystal on silicon (LCOS) displays. Beam blocker 700 can be made of any number of cells in a grid-like pattern, such as for example, cell 710 or cell 720. In an example, the number of cells can be equal to the number of collimated beams. In other examples, there can be plurality of cells for each collimated injector beam. For example, there can be a fixed multiple number of cells for each collimated injector beam, which in turn can correspond to the number of MEMS mirrors. The grid of cells can be electrically connected through a common electrode, as further explained below. In other examples, the cells can have individual cathodes and anodes or independent circuitry per pixel.

FIG. 7B illustrates a schematic cross section of an individual cell 710. The individual cell can include a glass plate 711, an electrode common to the grid of cells, such as common electrode 712, a liquid crystal layer or material, such as liquid crystal 713, a pixel mirror, such as mirror 714, and a silicon wafer or silicon layer, such as silicon layer 715. The glass plate 711, electrode 712, liquid crystal 713 and mirror 714 can all be on the same order of dimension as the MEMS mirror or the width of the beams of light. For example, the components can be on a millimeter or micrometer scale. Glass plate 711 can be any suitable glass material to enclose the other materials. Glass plate 711 can be common to all of the cells, or be an individual piece of glass for each cell. The common electrode can be a common electrode to all of the cells, such as a gate, source, or drain, or any other electrical component made of a suitable conductive material. The liquid crystal 713 can be made from any suitable liquid crystal material from the class of known liquid crystal materials based on the performance characteristics and time response requirements of the OCS system. Mirror 714 can be any suitable reflective material to ensure consistency in the shape of the mirror while retaining amount of reflectivity. As an example, a highly pure aluminum layer can be used as a mirror. The silicon layer 715 can be made of any suitable material, and further contain or have etched, patterned, sputtered, or otherwise layered thereupon suitable materials to enable the functionality described below. In one example, the silicon layer 715 can be a complementary metal-oxide semiconductor layer. In other examples, the semiconductor layer can be from a metal-oxide semiconductor field effect transistor fabrication process. Suitable spacing and geometry can exist within these layers to ensure the functionality described below.

As illustrated in FIG. 7B, a space or gap can exist between the common electrode 712, the mirror 714, and the silicon layer 715. Also represented in FIG. 7B is an incident ray of light, ray 716, and a reflected ray of light, ray 717. The incident ray of light, ray 716 reflects off mirror 714 to form the reflected ray of light, ray 717. The space between common electrode 712, mirror 714, and the silicon wafer 715 can contain electronics and circuitry to enable or disable an individual cell through the liquid crystal 713, as explained below. The liquid crystal material can be of a chiral nematic type, wherein the phase change is associated with a change in the orientation of the liquid crystal. Depending on whether the beam blocker is active, ray 717 can be blocked through either changing its phase and in turn, its polarization or through reducing its intensity.

Figure 7D:
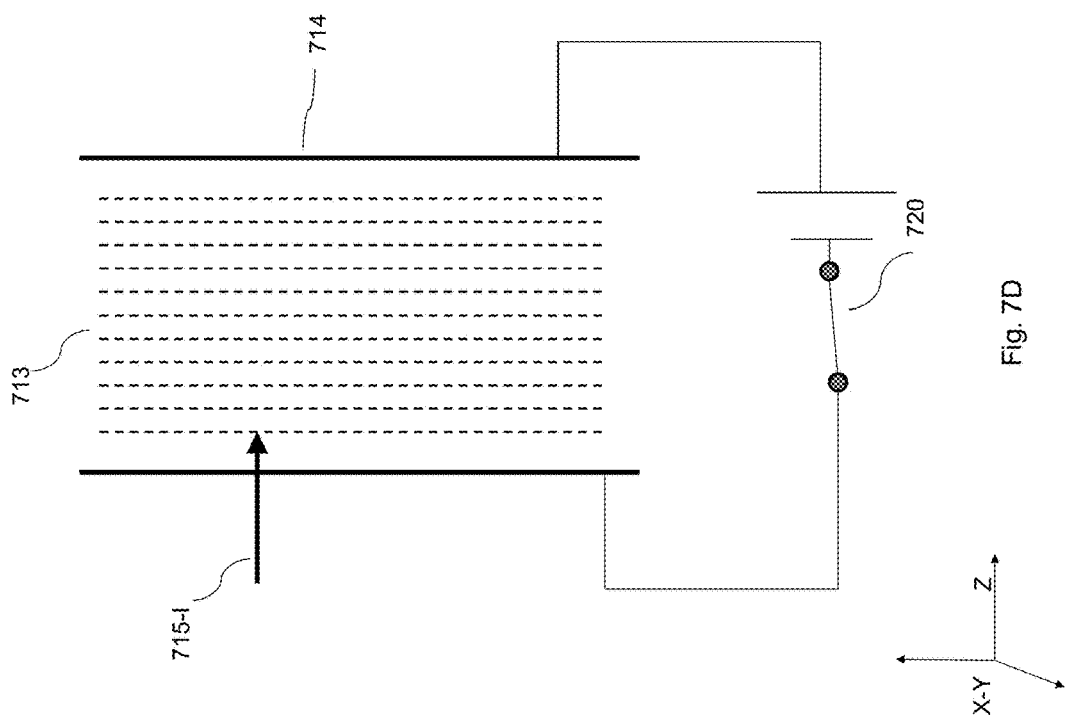
FIG. 7D is a diagram of a circuit associated with a pixel array of a programmable beam blocker according to aspects of the disclosure.
Figure 7C:
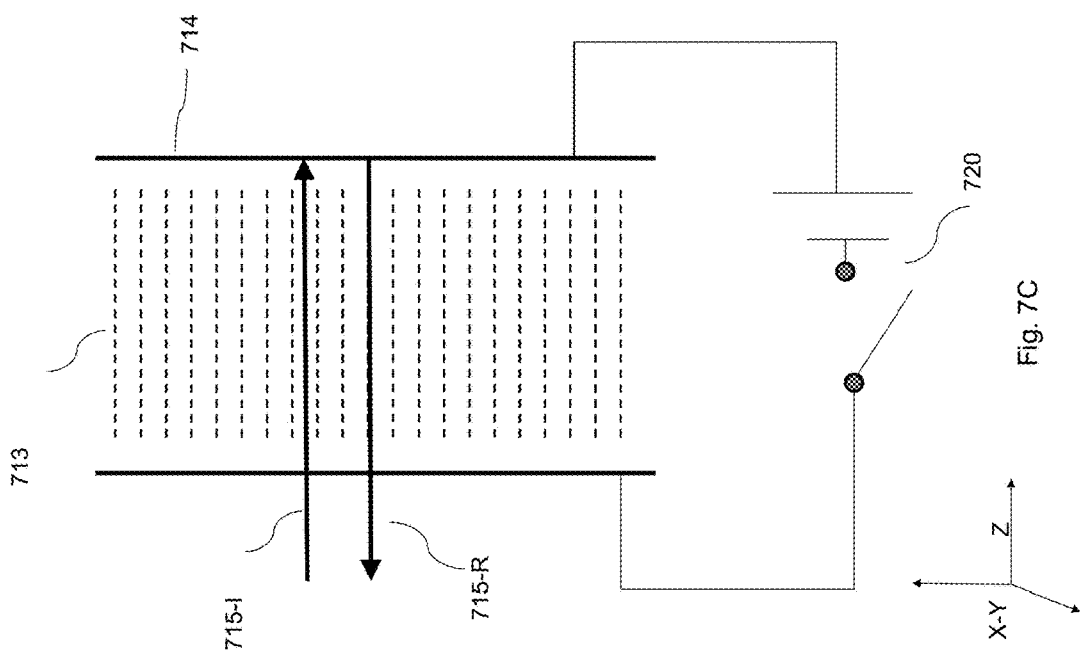
FIG. 7C is a diagram of a circuit associated with a pixel array of a programmable beam blocker according to aspects of the disclosure.

FIGS. 7C and 7D illustrate additional aspects of the beam blocker 700. Although FIGS. 7C and 7D illustrate one example in which beam blocker 700 operates through phase modulation, other implementations are possible. For example, the beam blocker 700 can be configured to modulate the intensity of a beam of light. In yet other examples, the beam blocker can be configured to modulate both the phase of the beam and the intensity of the beam of light simultaneously. In other examples, the beam blocker can be combined with filters, such as a polarization filter, to block light which has been phase modulated. For example, a polarization filter can be used to convert phase modulation into intensity modulation.

FIG. 7C is a schematic view of a circuit of an individual cell of the beam blocker 700, when voltage is not applied to the liquid crystal. FIG. 7C is illustrated to represent a cross section of an individual cell as taken along the x-y plane. Illustrated in parallel dashed lines is a liquid crystal material, such as liquid crystal 713. Switch 720, and the related circuit can be made from any suitable fabrication technique. Examples of switch 720 include but are not limited to power diodes, metal-oxide semiconductor field-effect transistors (MOSFET), bipolar junction transistors, insulated-gate bipolar transistor, thyristors.

Also illustrated in FIG. 7C is a switch 720 and an incident beam of light, 715-I, and a reflected beam of light, 715-R. In some examples in which the beam blocker 700 uses phase modulation, the incident beam of light 715-I and the reflected beam of light 715-R can be of the same phase. In other examples, where the beam blocker uses intensity modulation, the incident beam of light 715-I and the reflected beam of light 715-R can be of the same intensity. When voltage is not applied to the liquid crystal, such as when the switch is not connected and the circuit is in the off position, the liquid crystal 713 is arranged in a manner which allows for the beam of light to be transmitted through it.

FIG. 7D is a schematic view of a circuit of an individual cell when voltage is applied to the liquid crystal. Illustrated in parallel dashed lines is a liquid crystal material, such as liquid crystal 713. A phase shift occurs in a liquid crystal material when it is in the presence of a specific voltage. The liquid crystal material undergoes a phase shift in the presence of voltage, and thus has a different optical property when switch 720 is closed and the circuit is complete. The "polarity" of the liquid crystal rotates when subjected to voltage and the liquid crystal then prevents light from being transmitted through it. This rotation of the liquid crystal can be caused by the electromagnetic effects induced by the application of the voltage. An individual cell can thus prevent a beam from being transmitted through it. Illustrated in FIG. 7D is an incident beam of light, 715-I. In some examples, due to the polarization of liquid crystal 713, there may be no reflected beam of light. In other examples in which the beam blocker 700 uses phase modulation, any light reflected off of 714 can be of a different phase than the phase of beam of light 715-I. This phase shift can be used to block any light from leaving the cell through the use of a polarization filter. In other examples, beam blocker 700 can use intensity modulation to cause no light to leave the cell.

Although the example of liquid crystal material has been given in reference to FIGS. 7A-7E, other materials and processes can be used to make up beam blocker 700. In other examples, other materials, such as nanomaterials, crystalline metals, thermotropic liquid crystals, temperature-dependent materials, or memory based materials, can be used to block the transmission of photons or allow for the transmission of photons.

Figure 7E:
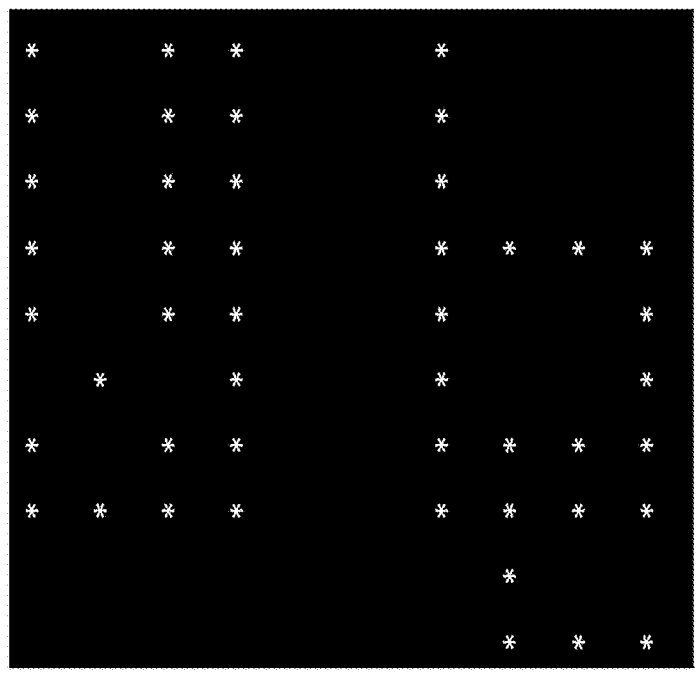
FIG. 7E is a diagram of a beam blocker and an image corresponding to the functional state of the beam blocker.
Figure 7E:
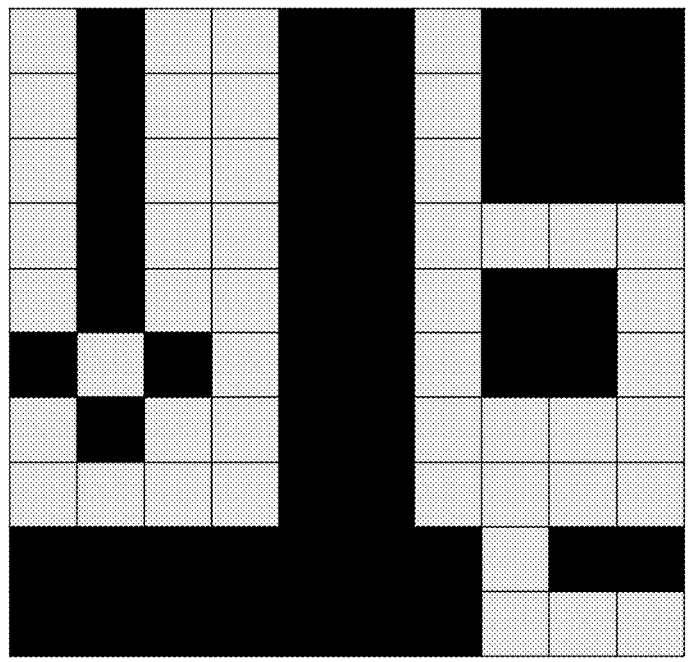

FIG. 7E illustrates another view of beam blocker 700 and an image 750 captured by a camera, the image 750 corresponding to the beams blocked by beam blocker 700. FIG. 7E illustrates a grid of cells, wherein "blacked" out cells correspond to those configured to block beams of light, and light cells correspond to those intended to allow beams of light to be transmitted. Image 750 illustrates an image 750 captured by a camera. Image 750 illustrates in white asterisks beams of light which are captured by a camera. In some examples, the camera can be a camera which contains photodetectors in the same arrangement as the cells in the beam blocker. For example, if the beam blocker is a 10 by 10 grid, the camera can also contain an array of 10 by 10 photodetectors. In other examples, the camera can be designed or chosen to have a large field of view, such as 40 mm by 40 mm. In this example, any light which is within the field of view of the camera will be imaged onto the camera sensor. The CMOS sensor pixel size does not have to match the LCOS pixel size because of the imaging optics and the number, size, and arrangement of the CMOS sensor pixels can be arbitrarily different from the LCOS pixel size. For example, the CMOS sensor may contain many times the number of pixels as those contained in the LCOS pixel to enable high precision images to be captured which can reflect the shape, outline, and other properties of the beams transmitted via the beam blocker 700. For example, such sample images can be seen with reference to FIG. 7F. It should be understood that other configurations are possible for the camera. The white asterisks on image 750 correspond to beams of light that passed through the beam blocker 700, while dark spots correspond to beams that were blocked.

According to some examples, the camera, in connection with the OCS control, can use the captured image to enable calibration of the MEMS mirror array, switch which beams are transmitted or blocked, or test the entire OCS system, without need to physically modify the OCS system configuration. As an example, if there is a discrepancy between the expected pattern on image 750 and the known configuration of beam blocker 700, it can be inferred that a malfunction with MEMS mirror array has occurred. Other algorithms and tests can be derived from other information received by the camera and captured in the image, such as the intensity, the spread, focus, or angle of the beams captured.

Figure 7F:
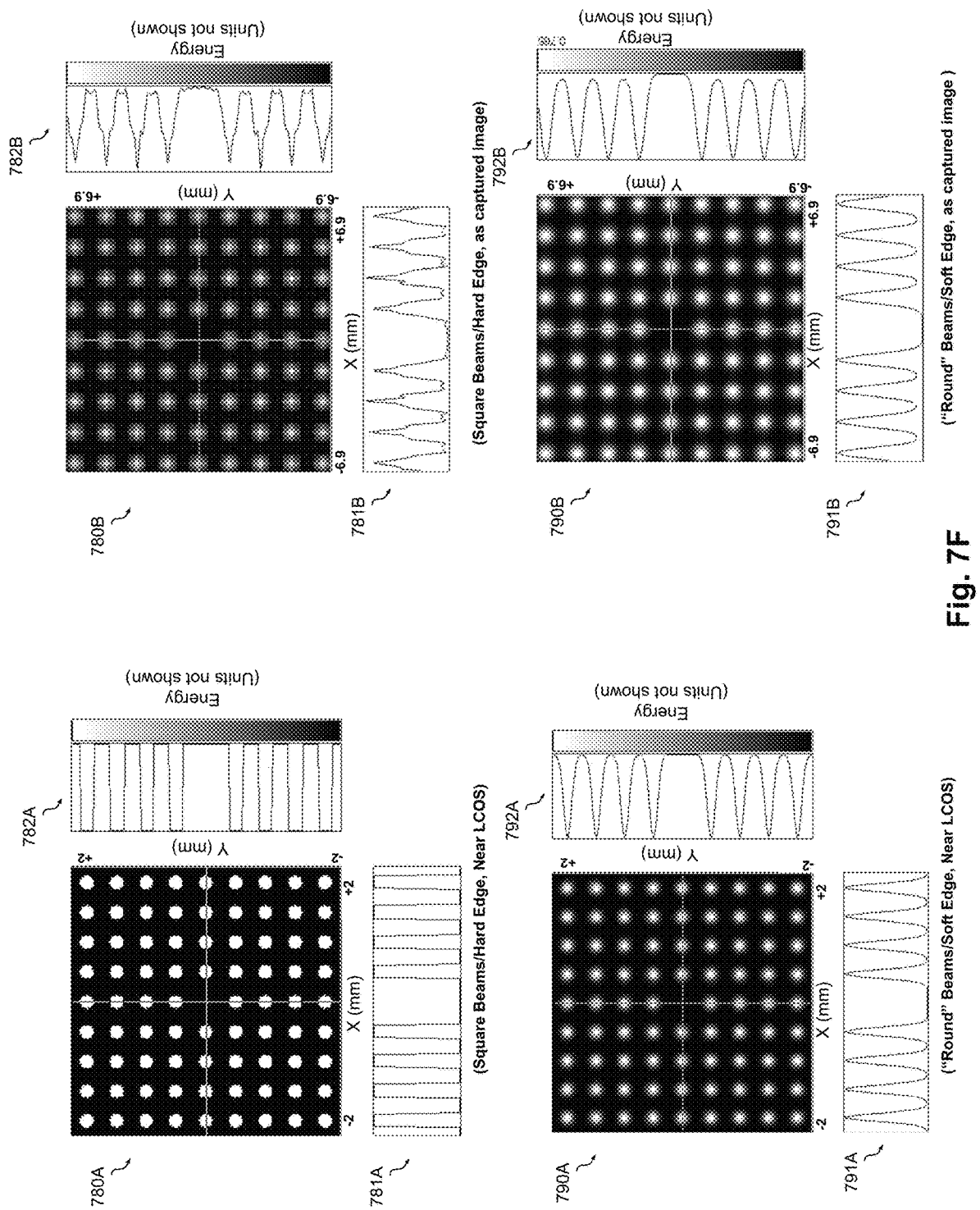
FIG. 7F illustrates properties of beams passing through a beam blocker and an image corresponding to the input beams, where portions of the beams have been gray-scaled.

FIG. 7F illustrates aspects of beams of light taken close to an LCOS as well as those taken by a camera. FIG. 7F illustrates intensity plots 780A and 790A, as taken at or near beam blocker 700, and intensity plots 780B and 790B, as taken as an image by a camera. FIG. 7F also illustrates plot 781A on the "x" axis and plot 782A on the "y" axis corresponding to plot 780A. The plots illustrate the amount of energy at any position, reflecting the intensity of light, at various positions on the x-y grid of each plot in greyscale, with "white" being the highest intensity of energy and black being the lowest intensity of energy. Plot 780A illustrates the shape of beams as captured on a 2 mm by 2 mm grid near the beam blocker. 780B illustrates the intensity of light as captured in an image at a camera corresponding to plot 780A. Also illustrated are plots 781B and 782B illustrating the x and y intensities of energy respectively. Plot 780A uses "square beams" to form intensity spots, which cause diffraction spikes as reflected in plot 780B, 781B, and 782B. Irregularities and noisy signals are found in 781B and 782B, which degrade the optical signal received. Further, the central portion of 781B and 782B reflect the diffraction caused by using "square" or "rectangular" signals.

FIG. 7F also illustrates plots 790A with corresponding plots 791A and 792A and plot 790B with corresponding plots 791B and 792B. Plot 790A illustrates the shape of beams as captured on or near a 2 mm by 2 mm grid near the beam blocker wherein the beams of light are roughly Gaussian in distribution. Compared to 780B, 790B illustrates that the peaks of the beams of light are more clearly defined and the signal received is less noisy due to lower diffraction of the light.

Figure 8:
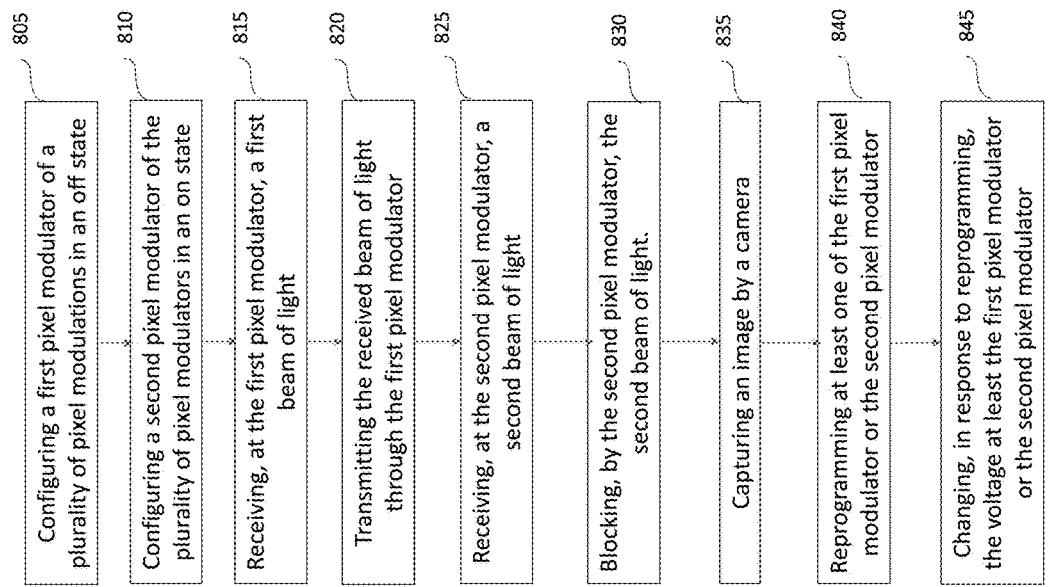
FIG. 8 is a flowchart of an example method according to aspects of the disclosure.

FIG. 8 illustrates flowchart of an example method 800 of programmably blocking individual beams of light in an optical circuit switch. While the method 800 is described below in a particular order, it should be understood that the operations may be performed in a different order or simultaneously. Moreover, operations may be added or omitted.

At block 805, a first pixel modulator of a plurality of pixel modulators can be configured in an off state. For example, in the off state, no voltage is applied to the pixel modulator. As one example, where the first pixel modulator includes an LCOS-SLM, the liquid crystal cells of the LCOS-SLM may be in a horizontal orientation. However, the liquid crystals can be at any range of orientation angles to produce a desired phase change or intensity change in the transmitted light. In some examples, the orientation may be an arbitrary orientation which causes the first pixel modulator to be in an off state.

At block 810, a second pixel modulator of the plurality of pixel modulators can be configured in an on state. For example, a voltage may be applied to the second pixel modulator to activate it. In the "on" state, where the second pixel modulator includes an LCOS-SLM, the liquid crystal cells may be oriented vertically or in another orientation that allows light to pass through. It should be understood that additional pixel modulators may be included in the optical circuit switch, wherein each pixel modulator may be individually configured in an "on" state or an "off" state. Similarly, at this step, the pixel modulator can also be turned to or configured in any grey scale state, which changes the phase of light and permits only a portion of the light to pass through and lowers the intensity of the light as compared to the "on" state.

At block 815, a first beam of light is received at the first pixel modulator. At block 820, the received beam of light is transmitted through the first pixel modulator.

At block 825, a second beam of light is received at the second pixel modulator. At block 830, the second beam of light is blocked by the second pixel modulator.

At block 835, an image may be captured by a camera. The image may correspond to the blocked and unblocked beams. For example, the image may include at least one spot of light, the at least one spot of light corresponding to the beam that was transmitted through the first pixel modulator in block 820. The image may further include at least one dark spot, the at least one dark spot corresponding to the blocked light of block 830. Each beam of light transmitted or blocked by the plurality of pixel modulators may be represented in the camera image as a spot of light or a dark spot, depending on whether it was transmitted or blocked by the respective pixel modulator.

At block 840, at least one of the first pixel modulator or the second pixel modulator can be reprogrammed. For example, at block 845, the voltage applied to a pixel by at least one of the first pixel modulator or the second pixel modulator can be changed. For example, the first pixel modulator may be switched to the "on" state by applying a voltage to it. As another example, the second pixel modulator may be switched to the "off" state by ceasing application of the voltage.

According to some example methods, various aspects of the OCS system can be evaluated. For example, the functionality of the beam blocker can be made based on algorithmic comparisons between information captured by the camera and information related to the functionality of the beam blocker. As another example, operation of the MEMS mirror or MEMS mirror controllers can be evaluated by comparing at least information received by or captured from the camera.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A programmable beam injector comprising:
a light source adapted to generate a beam of light;
a beam splitter configured to receive the beam of light from the light source and polarize the received beam of light; and
a beam blocker receiving the polarized beam of light from the beam splitter, comprising a plurality of pixel modulators, wherein each pixel modulator includes a plurality of cells comprising phase change material, wherein each pixel modulator is independently operable between an off state in which the light passes through and an on state in which the light is blocked.

2. The programmable beam injector of claim 1 wherein the programmable beam injector further comprises a data connector configured to send and receive data or interface with an optical switching circuit control.

3. The programmable beam injector of claim 2 wherein the programmable beam injector is configured to receive information related to its operation from the optical switching circuit control based on at least an image generated from a camera receiving beams from the programmable beam injector.

4. The programmable beam injector of claim 1 wherein the beam blocker contains a number of the pixel modulators that corresponds to a number of MEMS mirrors used in an optical switching circuit.

5. The programmable beam injector of claim 1 wherein:
one or more of the plurality of pixel modulators is operable in a partial state in which only a portion of the light is passed through the beam blocker; and
the beam blocker is used to shape the received polarized beam of light to conform to a beam profile.

6. The programmable beam injector of claim 1 wherein the programmable beam injector beam blocks beams through modulation of the phase of the received beam of light.

7. The programmable beam injector of claim 1 wherein the programmable beam injector blocks beams through intensity modulation of the received polarized beam of light.

8. An optical switching circuit comprising:
a microelectromechanical systems (MEMS) mirror configured to receive a beam of light;
a camera configured to capture the beam of light;
a fiber collimator; and
a programmable beam injector comprising:
a light source adapted to generate the beam of light;
a beam splitter configured to polarize the beam of light from the light source; and
a beam blocker, the beam blocker comprising:
a plurality of pixel modulators, wherein each pixel modulator includes a plurality of cells comprising phase change material, wherein each pixel modulator is independently operable between an off state in which the light passes through and an on state in which the light is blocked.

9. The optical switching circuit of claim 8, wherein the programmable beam injector further comprises a data connector.

10. The optical switching circuit of claim 9 wherein the data connector is configured be in data communication with an optical control switch controller.

11. The optical switching circuit of claim 9, wherein the programmable beam injector receives instructions based on algorithms which utilize as input information from at least the camera and a MEMS mirror controller.

12. The optical switching circuit of claim 8, wherein each cell of the plurality of cells further comprises a polarization filter layer.

13. A method of selectively blocking, in an optical switching circuit, a beam of light generated by a light source comprising:
configuring a first pixel modulator of a plurality of pixel modulators in an off state, wherein voltage is not applied to the first pixel modulator;
configuring a second pixel modulator of the plurality of pixel modulators in an on state, wherein a voltage is applied to the second pixel modulator;
receiving, at the first pixel modulator, a first beam of light;
transmitting the received first beam of light through the first pixel modulator;
receiving, at the second pixel modulator, a second beam of light; and
blocking, by the second pixel modulator, the second beam of light.

14. The method of claim 13 further comprising capturing, by a camera, an image wherein the image represents blocked beams with dark spots and unblocked beams with light spots.

15. The method of claim 13, further comprising reprogramming at least one of the first pixel modulator or the second pixel modulator.

16. The method of claim 15, wherein reprogramming the at least one of the first pixel modulator or the second pixel modulator comprises changing a voltage applied to the at least one of the first or second pixel modulators, such that the pixel modulator transitions to a different state as a result of the change in applied voltage.

17. The method of claim 14, further comprising comparing at an OCS controller, information generated from the captured image with information related to the plurality of pixel modulators.

18. The method of claim 17 further comprising automatically reprogramming a pixel modulator corresponding to a beam of light when information generated from the captured image indicates that a parameter of the beam of light is below a certain threshold.

19. The method of claim 18, wherein the parameter measured is an intensity of the beam of light.

20. The method of claim 17 further comprising automatically reprogramming a second pixel modulator to transmit a previously blocked beam of light based on information from an optical control switch controller.

21. The method of claim 14, further comprising evaluating, at an OCS controller, a malfunction in a MEMS mirror array or a MEMS controller based upon information generated from the captured image, information related to the plurality of pixel modulators, and information received from the MEMS controller.

22. A system, comprising:
   a programmable beam injector comprising a beam blocker configured to receive light from a beam splitter, comprising a plurality of pixel modulators, wherein each pixel modulator includes a plurality of cells comprising phase change material, wherein each pixel modulator is independently operable between an off state in which the light passes through and an on state in which the light is blocked; and
   one or more processors in communication with the programmable beam injector.

23. The system of claim 22, wherein the one or more processors includes an application specific integrated circuit (ASIC).

* * * * *